Patented Mar. 19, 1940

2,194,218

UNITED STATES PATENT OFFICE 2,194,218

STABLE EMULSIONS OF WATER WITH LIQUID OR LIQUEFIABLE SUBSTANCES WHICH ARE IMMISCIBLE WITH WATER

Thurstan Wyatt Dickeson, Newmarket, Auckland, New Zealand

No Drawing. Application September 13, 1937, Serial No. 163,676. In Great Britain September 21, 1936

9 Claims. (Cl. 167—43)

This invention relates to stable emulsions of water with liquid or liquefiable substances which are immiscible with water, and to preparations comprising the same, and to methods of making the said emulsions and preparations, and to applications of the said emulsions and preparations. The said emulsions, or the said preparations comprising the same, are suitable for a very great variety of purposes.

In this specification where the context so admits the words "liquid" or "liquid substance" are to be deemed substances which are capable of being brought for the purposes of the invention into the liquid state.

Stable emulsions according to the present invention comprise water, a liquid immiscible with water and activated gelatinous alumina, as hereinafter defined, as the emulsifying agent.

Hitherto gelatinous alumina has been prepared by precipitation from reasonably concentrated aqueous solutions by double decomposition of an aluminium salt, (such as, for example, aluminium sulphate, potash alum, or ammonium alum), with an alkali (such as, for example, sodium carbonate, ammonia, or caustic soda); or by the action of acids on soluble aluminates; or by hydrolysis of aluminium salts; or by other methods. In all cases the resulting gelatinous alumina tested gives variable results according to the method and conditions of precipitation and to the nature of the oil which it is desired to emulsify. These freshly prepared gelatinous aluminas are specially unsuccessful with vegetable oils particularly those of an acid nature.

A method has now been devised by means of which an improved kind of gelatinous alumina can be produced or prepared which possesses emulsifying properties of the highest order. Such gelatinous alumina is hereinafter termed "activated gelatinous alumina" and it is to be understood that in this specification "activated gelatinous alumina" means gelatinous alumina when prepared by the said method.

This method or process is characterised by the solutions containing the precipitate of gelatinous alumina produced in the course of the well known processes referred to above being maintained, together with the precipitate, at boiling point for a short time and by the precipitate, mixed with water, finally obtained being matured, ripened or aged for a period of two or three days, or more.

The mixture may be ripened while in the form of a paste or cream and in this form it is ripened preferably in the atmosphere and in sunlight. It may however be ripened in a container.

The mixture may moreover be ripened under water, which water may or may not be removed and replenished from time to time, or the water may be changed continuously. Well ripened samples of activated gelatinous alumina as well as emulsions in which such samples are employed have been found to be extremely resistant to and insoluble in acids.

The following is given as one example of carrying out the process:

400 grams of commercial ammonium alum are dissolved in one litre of boiling water and the solution is kept at 100° C. 450 grams of commercial sodium carbonate are dissolved in one litre of boiling water and the solution is added intermittently in quantities, each of about 120 cc., to said boiling solution of alum, resulting in the formation of a precipitate of gelatinous alumina. This intermittent addition of said small quantities of said sodium carbonate solution is continued until ammonia can just be smelt in the air a few centimetres above the surface of the solution, when said addition is stopped. It is very advisable not to add a large excess of sodium carbonate. One litre, or so, of boiling water is now added to the solution containing the precipitate, and the whole is maintained at boiling point for a short time and allowed to stand for about 24 hours. The supernatant clear solution is then decanted or syphoned off from the deposit, and to the deposit left there is added about so much cold or warm water as exceeds in volume by one litre the volume of the solution at the completion of the precipitation process. This water is now stirred with the deposit and the whole then allowed to stand for about 24 hours, after which the clear solution is decanted or syphoned off. Cold or warm water is again added, the amount being as before, and the same is stirred with the deposit, and the whole is allowed to stand for about 24 hours, after which the clear liquid is decanted or syphoned off. The deposit is collected and evaporated preferably at about 50° C. until its water content is from about 15% to about 97½%. This product is then removed from the trays and is kept, preferably for a considerable time, in substantially the same state, in so far as its state of moisture is concerned, until it is to be used for emulsifying purposes. In order to aid in maintaining the water content substantially constant the material may be kept in an atmosphere maintained suitably moist to prevent evaporation unduly reducing the water content, or may be kept in closed containers.

The evaporating operation is preferably carried out slowly and preferably at a comparatively low temperature, say 50° C., in order to avoid all danger of portions of the precipitate becoming anhydrous or becoming transformed into a hard, granular, or powdery state.

The following is a second example:

45 grams of ammonium alum are dissolved in 100 cc. of tap water. A second solution, containing 50 grams of sodium carbonate crystals in 100 cc. is made up, brought to the boil and added gradually and with constant stirring to the boiling alum solution. Effervescence takes place and a white gelatinous precipitate is formed. Addition of the sodium carbonate solution is continued until a smell of ammonia can be distinguished and the solution reacts alkaline to phenolphthalein. The solution containing the precipitate is maintained at boiling point for a short time and the precipitate is then collected in a Büchner filter, washed well with distilled water and then suspended in a litre of distilled water contained in a beaker through which a slow stream of warm water is allowed to circulate. By the end of half a day, the alumina begins to show emulsifying properties and in 2–3 days' time these become excellent, the product being activated gelatinous alumina.

Activated gelatinous alumina, like gelatinous alumina in general, may probably be represented by the formula $Al_2O_3.xH_2O.yH_2O$ where $xH_2O$ is the water of chemical constitution and $yH_2O$ the water held by physical absorption or other forces. Activated gelatinous alumina is preferably kept mixed with free water since its activity decreases as the system loses water which has been held by physical absorption or other forces. This mixture of activated gelatinous alumina and free water hereinafter termed "aqueous activated gelatinous alumina" is the starting material usually taken in the preparation of an emulsion according to the present invention. Its water content may be from about 15% to about 97½%.

The proportion of activated gelatinous alumina used should, in general, be of the order of 0.5–2.5% (dry weight) calculated on the volume of oil or other water-immiscible liquids in the emulsion. This is assumed in the examples quoted throughout this specification, except in those relating to cosmetics and other substances which contain activated gelatinous alumina as a filler as well as an emulsifying agent.

When it is desired to make an emulsion in accordance with the present invention the normal procedure is to take said aqueous activated gelatinous alumina and to dilute it by admixture with a further volume of water so as to form a mobile suspension, the water content of which may be as great as 99.5%, and to mix the suspension with a liquid which is immiscible with water and to agitate it with said liquid until an emulsion is formed. However, where an emulsion of low water content is required, said initial undiluted aqueous activated gelatinous alumina may be employed instead of said mobile suspension. The emulsion produced may be diluted with water. The amount of activated gelatinous alumina present in the final emulsified product may be between 0.1% and 95%, depending on the liquid emulsified and on the purpose for which the emulsion is to be used. The water employed during any part of the process may be distilled water, or temporarily or permanently hard water, salt water, sea water, brackish water, or lime water.

The diameter of the globules of the emulsions according to the present invention may be as large as 1.0 mm. The globules may however be as small as 1$\mu$ according to the degree of mechanical disintegration.

It may be stated that as a rule emulsions made with other emulsifying agents are more or less stable according to the size of the dispersed particles. In emulsions made with activated gelatinous alumina on the other hand stability bears no relation to particle size, coarse emulsions containing large particles showing no signs of breaking over a period of years.

An emulsion according to the present invention may contain an excess of activated gelatinous alumina.

When it is desired to form an emulsion, according to the present invention, containing two or more liquids immiscible with water, separate emulsions according to the present invention, each containing one of the liquids, may be produced and said separate emulsions may then be mixed together to form a single emulsion. In the majority of cases, however, the separate liquids may be mixed together or added to one another and be simultaneously emulsified with water by means of activated gelatinous alumina. Alternatively, an emulsion, according to the present invention, of one of the liquids may first be produced and the other liquid or liquids be added to and mixed with the emulsion, extra activated gelatinous alumina being added if and as necessary.

As already stated emulsions according to the present invention, or preparations comprising them, may be used for a great variety of purposes in very many industries and occupations. As examples of these emulsions or preparations may be mentioned insecticides, disinfectants, soil-fumigators, cosmetics, paints, varnishes, distempers, polishes, cements, plasticizers, foods, pharmaceutical preparations, medicines, fuel lubricating preparations, rubber-containing emulsions, and emulsions or emulsion-containing preparations used in dyeing, tanning, wool-batching and cleaning operations, or in soap manufacture, or in the preparation of road surfaces.

The following classes or groups of emulsions or preparations according to the present invention, are given merely by way of example.

CLASS A.—COSMETIC EMULSIONS OR PREPARATIONS

The cosmetic emulsions or preparations in this group are cosmetic skin preparations including lipstick preparations, and cosmetic hair preparations, cosmetic nail preparations, and dentifrices. As examples of cosmetic skin preparations may be mentioned vanishing and disappearing creams, day creams, oily night creams, face rouges, perfume pomades, cleansing creams, deodorant creams, astringent creams, skin tonic creams, skin food creams, and theatrical creams.

Some of the cosmetic creams according to the present invention may be used for purposes for which hitherto separate creams have had to be employed. For instance, some of the new creams may be used both as day creams and as night creams.

Hitherto cosmetic skin preparations have as a rule, particularly when manufactured from stearic acid as one of the starting materials, been manufactured by a "hot process." In the case of processes employing stearic acid, the same is usually melted in a water bath heated to 85° C. or so, and other hot starting materials, for instance, potassium hydroxide and oleic acid are added.

In the preparation of the cosmetics according to the present invention "cold processes" are preferably employed, in which no artificial heating operation is used, even when one of the starting materials is a fat which is solid at all ordinary atmospheric temperatures and even at 50° C. or so.

A cosmetic preparation according to the present invention comprises an emulsion (which term is to be understood to include a dispersion) with water of one or more oils or fats suitable for cosmetic preparations, with activated gelatinous alumina as the emulsifying agent. The cosmetic preparation may be made in any suitable manner but the process set forth below and forming part of the subject-matter of the present invention is preferably employed. The emulsions may be water-in-oil emulsions or oil-in-water emulsions.

In the preferred process of manufacture the emulsification of the one or more oils or fats, which are to form the base of the preparation, is effected by intimately mixing the aqueous activated gelatinous alumina with said one or more oils or fats and is preferably performed in the cold, that is, without a special heating operation.

Any vanishing cream according to the present invention has far greater toning and stimulating properties and skin food value than vanishing creams hitherto known, because all oil or fats contained in the cream may be exceedingly finely emulsified. For the same reason the percentage of oil or fat contained in the vanishing creams may be far greater than hitherto. It will be understood from the above that these new vanishing creams are also skin tonic creams.

The manufacture of a vanishing cream which has not only an excellent toning and stimulating effect on the skin but acts as a most valuable and efficient powder base, is as follows:

Take benzoinated lard 5% to 75% and mix it well with expressed almond oil 2% to 10% to form a smooth mixture. Take a small quantity of the aqueous activated gelatinous alumina preferably having a water content of about 65% to 95% and incorporate it by rubbing or otherwise with the mixture, gradually adding a little water. The water helps to break up the fat and oil into fine particles and globules. The thorough incorporation of the emulsifying agent and the mixture is a matter of great importance in order to obtain the requisite vanishing effect. After this incorporating operation, more of the emulsifying agent mixed with additional water, is added to make up to the 100%, and is mixed in by agitating or whipping the whole mixture or otherwise until the finished product is of the quality desired. The consistency of the cream depends on the amount of the aqueous activated gelatinous alumina, the water content of the latter and the extra amount of water added if any. Fillers, such as talcum, kaolin, starch or gum tragacanth may also be added and mixed in. Such fillers, however, are not always necessary since extra quantities of the emulsifying agent itself may be used as a filler. If desired, the filler employed may be face powder. The percentage of the fat and oil depends on the kind of cream required. When manufacturing on a large scale a cream mill or whipping machine may be used for carrying out the agitating operations. Colouring matter and perfume may also be added.

The following are examples of the ingredients of creams according to the present invention, the first example being that contained in the above method. Fillers, colouring matter and perfume, with or without other admixtures, may be added as desired.

*Example I.—Vanishing cream*

| | |
|---|---|
| Benzoinated lard | 5% to 75% |
| Expressed almond oil | 2% to 10% |
| Aqueous activated gelatinous alumina with or without additional water | The remainder |

*Example II.—Night cream*

| | |
|---|---|
| Benzoinated lard | 5% to 75% |
| Lanoline | 2% to 10% |
| Aqueous activated gelatinous alumina with or without additional water | The remainder |

*Example III.—Vanishing cream*

| | |
|---|---|
| Benzoinated lard | 5% to 75% |
| Wool fat | 2% to 10% |
| Glycerine | 2% to 10% |
| Aqueous activated gelatinous alumina with or without additional water | The remainder |

*Example IV.—Theatrical cream*

| | |
|---|---|
| Benzoinated lard | 5% to 75% |
| Wool fat | 2% to 10% |
| Liq. paraffin white | 10% to 20% |
| Aqueous activated gelatinous alumina with or without additional water | The remainder |

*Example V.—Cleansing cream*

| | |
|---|---|
| Liquid paraffin | 5% to 20% |
| The preparation known under the registered trade-mark "Vaseline" | 10% to 40% |
| Lanoline or Wool Fat | 5% to 20% |
| Aqueous activated gelatinous alumina with or without additional water | The remainder |

*Example VI.—Vanishing cream*

| | |
|---|---|
| Gum tragacanth | 1% to 5% |
| Starch | 1% to 5% |
| Thick liquid paraffin | 5% to 10% |
| Lanoline | 2% to 10% |
| The preparation known under the registered trade-mark "Vaseline" | 10% to 30% |
| Aqueous activated gelatinous alumina with or without additional water | The remainder |

*Example VII.—Skin tonic*

| | |
|---|---|
| Mutton fat | 5% to 75% |
| Lanoline | 2% to 10% |
| Glycerine | 2% to 10% |
| Aqueous activated gelatinous alumina with or without additional water | The remainder |

*Example VIII.—Tonic vanishing cream*

| | |
|---|---|
| Benzoinated lard | 5% to 50% |
| Wool fat | 5% to 20% |
| Expressed almond oil | 5% to 20% |
| Aqueous activated gelatinous alumina with or without additional water | The remainder |

*Example IX.—Lipstick-salves and rouge paste*

| | |
|---|---|
| Paraffin wax | 5% to 30% |
| The preparation known under the registered trade-mark "Vaseline" | 10% to 60% |
| Aqueous activated gelatinous alumina with or without additional water | The remainder |

To the above colour is added to the amount required.

*Example X.—Nail polishes*

| | |
|---|---|
| The preparation known under the registered trade-mark "Vaseline" | 20% to 50% |
| Paraffin wax | 5% to 20% |
| Liquid paraffin | 5% to 20% |
| Polishing powder | |
| Aqueous activated gelatinous alumina with or without additional water | The remainder |

*Example XI.—Deodorant cream*

| | |
|---|---|
| Aluminium chloride | 5% to 20% |
| Benzoated lard | 5% to 20% |
| Aqueous activated gelatinous alumina with or without additional water | The remainder |

*Example XII.—Hair oil*

| | |
|---|---|
| Expressed almond oil | 10% to 40% |
| Paraffin oil | 10% to 40% |
| Aqueous activated gelatinous alumina with or without additional water | The remainder |

*Example XIII.—Hair tonic*

| | |
|---|---|
| Castor oil | 5% to 30% |
| Almond oil | 5% to 30% |
| Olive oil | 5% to 30% |
| Aqueous activated gelatinous alumina with or without additional water (perfume) | The remainder |

*Example XIV.—Hair Pomade*

| | |
|---|---|
| The preparation known under the registered trade-mark "Vaseline" | 20% to 50% |
| Expressed almond oil | 10% to 20% |
| Castor oil | 5% to 10% |
| Olive oil | 5% to 20% |
| Aqueous activated gelatinous alumina with or without additional water | The remainder |

*Example XV.—Hair Brilliantine*

| | |
|---|---|
| Olive oil | 10% to 40% |
| Paraffin oil | 10% to 40% |
| Aqueous activated gelatinous alumina with or without additional water | The remainder |

*Example XVI.—Dandruff preventative*

| | |
|---|---|
| Cocoanut oil | 10% to 40% |
| Olive oil | 5% to 20% |
| Paraffin oil | 5% to 20% |
| Salicylic acid | 2% to 10% |
| Aqueous activated gelatinous alumina with or without additional water | The remainder |

*Example XVII.—Dentifrice*

| | |
|---|---|
| Glycerine | 5% to 20% |
| Magnesium oxide | 5% to 20% |
| Calcium phosphate | 5% to 20% |
| Calcium carbonate | 1½% to 5% |
| Paraffin oil emulsified with the aqueous activated gelatinous alumina | The remainder |

Oil of lemon, phenol, oil of wintergreen, menthol, oil of peppermint, and colouring matter may be added to the above, in quantities as desired.

It will be understood that the examples given above may all be manufactured by any suitable process. If desired, methods employing heating operations for melting the ingredients, or for heating the aqueous activated gelatinous alumina, with or without extra water, may be employed.

CLASS B.—INSECTICIDES, DISINFECTANTS, PRESERVATIVES AND ANIMAL FOODS

In this specification this class designated "Insecticides, disinfectants, preservatives and animal foods" is to be understood to include, in addition to all insecticides, disinfectants, preservatives and animal foods strictly so called, all similar preparations, such as, for instance, fungicides, antiseptics, bactericides, germicides, pest-destroying and vermin-destroying compositions (such as, for instance, blow-fly pest sprays, grass grub sprays and preparations for destroying locusts), soil-fumigators, medicinal or healing preparations for animals, and other like agricultural and horticultural preparations or sanitary compositions, or animal or vegetable life destroying or life preserving preparations. From this class are excluded all cosmetic emulsions or preparations included in Class A.

A preparation, of this class, according to the present invention comprises an emulsion (which term is to be understood to include a dispersion) with water of one or more oils or fats or waxes (whether animal, vegetable, mineral or synthetic), or of one or more oleates, or of a mixture of one or more oils or fats or waxes with one or more oleates, with aqueous activated, gelatinous alumina as the emulsifying agent. The one or more oils, fats, or waxes, or one or more oleates, to be taken may be any oil, fat or wax, or oleate ordinarily taken, or suitable, for the purpose for which the preparation is intended.

In the preferred process of manufacture the emulsification of the one or more oils, fats, or waxes, or of the one or more oleates, or of a mixture of one or more oils, fats, or waxes with one or more oleates, is effected by intimately mixing or rubbing the emulsifying agent with the material to be emulsified.

A preparation of this class, according to the present invention may comprise a mixture of preparations according to the invention. Thus a preparation comprising an emulsion of oil with water with aqueous activated gelatinous alumina as emulsifying agent may be mixed with a preparation comprising an emulsion of an oleate with water with aqueous activated gelatinous alumina as emulsifying agent.

In this specification the term "oil" is to be understood to include "fat" or "wax" when the context admits or requires.

Oils of the paraffin series are, for instance, very suitable for use in many of the preparations, of this class, according to the invention, and in many of the preparations containing oleates the following, for example, may be used, viz: copper oleate, arsenic oleate, mercury oleate, and nicotine oleate. Many other oleates of metals and alkaloids may be employed.

A number of examples of preparations, of this class, according to the present invention, and of methods of making the same, will now be given simply as illustrations.

*Example I.—Insecticide for summer use*

Take white paraffin oil 5% to 80% having a viscosity between 45 and 85 seconds and volatility not less than 30% or more than 50% in four hours at 105° C.: iodine value not more than 6. Form an emulsion with aqueous activated gelatinous alumina and add water to 100%.

*Example II.—Soil-fumigating agent*

Take benzine 5% to 90% and emulsify with aqueous activated gelatinous alumina and add water to 100%.

*Example III.—Anti-grass-grub preparation*

Take kerosene, 5%–45%, and benzine, 5%–45%, and emulsify with aqueous activated gelatinous alumina and add water to 100%.

*Example IV.—Nicotine oleate spray for many purposes*

Take 2.5 quarts of 40% nicotine and mix with 1.75 quarts of commercial oleic acid to make 4.25 quarts of nicotine oleate, and emulsify the latter with aqueous activated gelatinous alumina and water. This emulsion of nicotine oleate when used as a spray retains its nicotine value much longer than an ordinary nicotine spray. This preparation may be mixed with other preparations, for instance, with sheep-dips, blow-fly preparations, oil fruit sprays, locust sprays and other horticultural preparations.

*Example V.—Horticultural spray*

Combine copper oleate, or arsenic oleate, with paraffin oil and emulsify the mixture with water by means of aqueous activated gelatinous alumina. As an example, mix intimately cooper oleate, 5%–45%, paraffin oil, 5%–45%, and emulsify the mixture with aqueous activated gelatinous alumina and add water to 100%. The process may be set forth in detail as follows:

The copper oleate which is in the form of a waxy solid is gently heated and melted and thoroughly mixed with the paraffin oil until a smooth mixture is formed. A portion of this mixture is taken and agitated with aqueous activated gelatinous alumina and water. More of the mixture is then added and agitated until the whole is emulsified, a homogeniser or other emulsifying machine or emulsion-treating machine being employed, if desired. The resultant emulsion can be diluted with water, added gradually in small quantities, to the different strengths required for the particular work to be carried out. This emulsion of copper oleate and paraffin oil when applied as a spray acts as an insecticide on account of the presence of the paraffin oil and as a fungicide on account of copper oleate. When applied to fruit trees it serves to guard the latter against "curly leaf" for example.

*Example VI.—Nicotine oleate and oil spray for many purposes*

Take nicotine oleate, 5%–70%, paraffin oil, 2½%–20%, and form an emulsion using aqueous activated gelatinous alumina and adding water up to 100%.

*Example VII.—Insecticide and fungicide*

| | Per cent |
|---|---|
| Nicotine oleate | 5–45 |
| Paraffin oil | 5–45 |
| Copper oleate | 5–45 |
| Paraffin oil | 5–45 | emulsified in water by means of aqueous activated gelatinous alumina.

*Example VIII.—Insecticide and fungicide*

Form an emulsion of paraffin oil with water with aqueous activated gelatinous alumina as emulsifying agent and add Bordeaux mixture (copper sulphate and lime) thereto, or add said emulsion to the Bordeaux mixture.

This preparation is of great value since when ordinary winter spraying emulsion is placed in Bordeaux mixture the ingredients are thrown out and the spray becomes useless. For the same reason long periods have as a rule to be allowed between the spraying of Bordeaux mixture and the spraying of oil emulsions. The use, as a spray, of a single preparation containing an oil emulsion and also Bordeaux mixture obviously saves much time and expense.

*Example IX.—Anti-blow-fly preparation and sheep-dip*

| | Per cent |
|---|---|
| Kerosene | 20–40 |
| Terebene | 5–20 |
| Friar's balsam | 2–10 |
| Nicotine oleate | 2–10 | with aqueous activated gelatinous alumina and water to 100%.

In this emulsion four different substances each insoluble in water are present. This emulsion may be used not only as a most valuable anti-blow-fly spray for sheep and as a sheep-dip, but it may be used as an admixture for addition to any oil sheep-dips to increase their working value.

The Friar's balsam might be omitted from the above example, or benzine might be added, the ingredients and their strengths depending on the cases and districts to be treated.

*Example X.—South African and Australian locust spray*

Petroleum, kerosene, nicotine oleate with aqueous activated gelatinous alumina and water.

*Example XI.—Insecticide*

Add aqueous activated gelatinous alumina (water content 90%) to water, say a further 10 parts of water, and incorporate the aqueous activated gelatinous alumina until it is well dispersed and then add a further 10 parts water. Add finely cut paraffin wax about one third the quantity by weight and heat, stirring all the time. Bring to boiling point, and still keep stirring. Then transfer to a hot container and agitate briskly until cold or until cooled to that temperature at which the emulsion, dispersion, or colloidal phase is obtained and remains stable. This mother emulsion, dispersion, or colloidal phase, can be added to water *ad lib.* to the strength desired. Any water can be used such as temporarily hard or permanently hard water, lime water, salt water, or sea water, for instance.

The above process can be employed to emulsify any other waxes in water.

*Example XII.—Preparation for soil-fumigation and other horticultural purposes, or for use as a medical preparation for animals*

Mix intimately: Carbon tetrachloride, 10%–90%, with aqueous activated gelatinous alumina and water to form a mother emulsion of the required strength. This mother emulsion is then broken down with water to the strengths desired for the various applications. Cotton-seed oil or other oils may be added to the carbon tetrachloride before making the emulsion.

*Example XIII.—General healing preparation for animals*

| | Per cent |
|---|---|
| Paraffin oil | 20–40 |
| Carbolic oil | 20–40 |
| Friar's balsam | 5–20 |
| emulsified with aqueous activated gelatinous alumina, with or without extra water, to 100%. | |

*Example XIV.—Skin disease preparation for dogs, or horticultural spray*

| | Per cent |
|---|---|
| Mercury oleate (20%) | 5–30 |
| Paraffin oil | 20–40 |
| emulsified with aqueous activated gelatinous alumina, with or without extra water, to 100%. | |

In making this preparation mix the mercury oleate with the paraffin oil, and when thoroughly mixed add a small quantity to aqueous activated gelatinous alumina and water; shake to form an emulsion, gradually adding the remainder of the mercury oleate and paraffin oil. When thoroughly emulsified add water and aqueous activated gelatinous alumina making up to 100%.

*Example XV.—Liniment.*

| | Per cent |
|---|---|
| Oil of turpentine | 20–50 |
| Camphor | 10–20 |
| Aqueous activated gelatinous alumina with or without extra water | The remainder. |

In making dissolve the camphor in the oil of turpentine and when thoroughly dissolved, emulsify with aqueous activated gelatinous alumina and water, adding the water to 100%.

*Example XVI.—Pig emulsion*

| | Per cent |
|---|---|
| Cod liver oil | 10–70 |
| Calcium chloride | 2–20 |
| Aqueous activated gelatinous alumina and water sufficient to make 100%. | |

*Example XVII.—Sheep foot rot*

| | Per cent |
|---|---|
| Iodine | 2–50 |
| Olive oil | 10–70 |
| Aqueous activated gelatinous alumina and water sufficient to make 100%. | |

*Example XVIII*

| | Per cent |
|---|---|
| Copper oleate | 10–80 |
| Aqueous activated gelatinous alumina and water sufficient to make 100%. | |

*Example XIX.—Insecticide*

| | Per cent |
|---|---|
| Cresylic acid | 5–20 |
| Paraffin oil | 10–30 |
| Carbon tetrachloride | 5–20 |
| Kerosene | 5–30 |
| Aqueous activated gelatinous alumina and water to make 100%. | |

*Example XX.—Insecticide*

| | Per cent |
|---|---|
| Cresylic acid | 5–50 |
| Naphthalene | 5–50 |
| Paraffin oil | 5–30 |
| Carbon tetrachloride | 5–30 |
| Aqueous activated gelatinous alumina and water to make 100%. | |

*Example XXI.—Worm remedy for cattle*

| | Per cent |
|---|---|
| Wormwood finely powdered | 15–20 |
| Tansy fine powder | 5–20 |
| Aloes fine powder | 5–20 |
| Linseed oil emulsified with aqueous activated gelatinous alumina to make 100%. | |

*Example XXII.—Fly and maggot oils*

| | Per cent |
|---|---|
| Oil of pennyroyal | 1 to 10 |
| Oil of lavender | 1 to 10 |
| Phenol | .25 to 1 |
| Naphthalene | 1 to 5 |
| Carbon tetrachloride | 1 to 10 |
| Kerosene | 10 to 30 |
| Fish oil | 20 to 60 |
| Aqueous activated gelatinous alumina and water to make 100%. | |

*Example XXIII.—Dog mange preparation*

| | Per cent |
|---|---|
| Oil of tar | 5 to 30 |
| Olive oil | 5 to 30 |
| Oil of turpentine | 5 to 30 |
| Aqueous activated gelatinous alumina and water to make 100%. | |

*Example XXIV.—Animal food*

Take fish oil or any other suitable oil or oils and form an emulsion of the same with water using aqueous activated gelatinous alumina. Add this emulsion to skimmed milk or separated milk in quantities that will give the same, or substantially the same, food and fat and vitamin values as those possessed by cream.

*Example XXV.—Calf feeding preparation*

| | Per cent |
|---|---|
| Cod liver oil or shark oil | 10 to 80 |
| Aqueous activated gelatinous alumina with or without the addition of water. | |

This can be used for calf feeding where the milk has been separated, the emulsified oil taking the place of cream.

*Example XXVI.—Soil fumigant*

Add carbon disulphide 10–90% to activated gelatinous alumina and water to form a mother emulsion of the required strength. This mother emulsion can be diluted with water to the strength required for application to the soil. This emulsion is stable and not affected by dilution with hard and other waters, nor does decomposition of the carbon disulphide take place on prolonged standing. Carbon disulphide emulsions used at present for beetle control in which soaps are used as emulsifying agents throw out on dilution with hard waters and moreover deteriorate on standing, the carbon disulphide being broken down and free sulphur precipitated.

CLASS C.—SUBSTANCES INTENDED FOR MEDICINE, INCLUDING MEDICATED BEVERAGES, AND PHARMACEUTICAL PREPARATIONS INTENDED FOR MEDICINE

This Class C includes substances intended for medicine, viz. medicines, medicated beverages, and pharmaceutical preparations intended for medicine, according to the present invention, not included in Classes A, B, D, G, H.

In the production of an exceedingly large number of medicines and other pharmaceutical prepations in which there are used dispensing oils, fats, waxes, resins and oleo resins, natural or synthetic, and other water-insoluble liquids, for internal or external use, it is very desirable— and in some cases essential—to emulsify said materials. It is frequently essential to do so in those cases in which it is necessary to incorporate chemical salts as auxiliary ingredients. In any event the emulsification of said materials greatly facilitates the addition of auxiliary ingredients such as flavours and colours, which ingredients may be added primarily for the purpose of producing a more elegant and palatable preparation.

In the production of most medicines and pharmaceutical preparations the conditions which the emulsifying agent employed should satisfy are very exacting. Thus the emulsifying agent should, firstly, be capable of forming a permanently stable true emulsion of the material to be emulsified; secondly, it should be such that when chemical salts and other ingredients are added to the emulsion the latter does not crack but still remains stable; thirdly, it should not have any detrimental action on the human system; and fourthly, it should be of such a nature that bacteria and germs will not attack it, since otherwise a preservative would have to be added.

None of the emulsifying agents in use today are able to satisfy all of the above conditions. The result is that when producing an emulsion of one single specific oil or other material it is necessary to use two or three emulsifying agents. Thus in order to prepare a paraffin emulsion the three emulsifying agents agar agar, tragacanth and acacia are used. In the production of cod liver oil emulsion tragacanth and acacia are used. For the emulsification of carbon tetrachloride in the production of preparations to be taken internally, no suitable emulsifying agents are known. If a caustic soap were employed as emulsifying agent, the preparation could not be used internally. When two or more emulsifying agents are employed in the emulsification of a single material, the very greatest care must be taken in the compounding as the emulsions otherwise are quite liable to crack, which may result in their being of little use, unless by means of much labour and manipulation the emulsion be brought back to its original state.

Now in producing the emulsions and preparations in this Class C emulsification is effected by means of aqueous activated gelatinous alumina which satisfies all the conditions enumerated above. The ingredients to be emulsified may be, for instance, fish oil, animal oils, vegetable oils (either fixed or volatile), mineral oils, oil mixtures such as, for example, comphorated oil, oleates, wood distillates, coal distillates, halogen derivatives such as, for example, chloroform and carbon tetrachloride, esters, resins, oleo-resins, gum resins, balsams and synthetic products such as, for example, phthalic anhydride, vinyl and phenolformaldehyde resins and ester gum. It is not only able to break up the oils, fats, waxes, resins or other material to be emulsified into minute globules or particles and to hold them in the dispersed phase in an elegant permanently stable condition, but is able simultaneously to emulsify a mixture of oils, fats, waxes, resins or other material to be emulsified. Aqueous activated gelatinous alumina is of medicinal benefit and will not be attacked by bacteria.

In carrying out the preferred process of manufacture water and aqueous activated gelatinous alumina may be added in small quantities to the material to be emulsified and the mixture be agitated; or the material to be emulsified may be added to the water and aqueous activated gelatinous alumina, or the material to be emulsified and water may be placed together and aqueous activated gelatinous alumina then be added.

Emulsification by using aqueous activated gelatinous alumina enables medicines, medicated beverages and other pharmaceutical preparations, to be made with unexampled convenience in many cases. For instance, merely to give one example, whereas hitherto in producing a preparation, termed carron oil, which is an emulsion of olive oil with lime water, the lime water has been the disperse phase, when proceeding according to the new method an emulsion of olive oil with lime water is prepared by emulsifying the olive oil by using aqueous activated gelatinous alumina with or without extra water. In this new emulsion the lime water is the continuous phase. This means that further water or lime water can be added to the emulsion which cannot be done in the case of the aforesaid carron oil. This olive oil water emulsion made with aqueous activated gelatinous alumina may be added to any other emulsion, for instance, it may be added to any one of the following emulsions, or to any combination of the same, viz. paraffin oil emulsion, castor oil emulsion, cod liver oil emulsion, carbon tetrachloride emulsion, or terebene pure emulsion. This may be effected without any specially careful manipulation or any special precautions being necessary. In preparing external remedies, emulsions of the following, for example, may be produced by using aqueous activated gelatinous alumina, viz. oil of turpentine, menthols, camphors, or oleo resins. These emulsions may then be incorporated with olive oil, castor oil, paraffin oil. By the action of aqueous activated gelatinous alumina in producing these preparations, perfectly stable and elegant emulsions can be compounded most conveniently, and moreover other ingredients which it may be desired to add can be incorporated without any detrimental effect on the emulsions.

When preparing an emulsion in the course of manufacturing a preparation, an excess of the emulsifying agent may be added in order that when the emulsion is added to one or more other materials the latter may readily be emulsified into the first emulsion to form a compound emulsion.

Protective colloids may be added to the emulsions.

Examples will now be given, purely by way of illustration, of the manufacture of internal remedies.

*Example I.—Remedy for constipation or tonic*

Emulsify any suitable quantity, say 10% to 90% of paraffin oil (British Pharmacopoeia Standard), using aqueous activated gelatinous alumina, and emulsify any suitable quantity, say 10% to 75% of olive oil (B. P. standard) using aqueous activated gelatinous alumina, and mix the same together, with or without extra water to make up to 100%.

*Example II.—Remedy for constipation*

Emulsify any suitable quantity, say 10% to 90% of paraffin oil (B. P. standard), using aqueous activated gelatinous alumina; emulsify any suitable quantity, say 10% to 75% of olive oil (B. P. standard), using aqueous activated gelatinous alumina; and emulsify any suitable quantity, say 10% to 75% of castor oil (B. P. standard), using aqueous activated gelatinous alumina, and mix the same together, with or without extra water to make up to 100%.

Example III.—Purgative

Emulsify any suitable quantity, say 10% to 90% of castor oil (B. P. standard), using aqueous activated gelatinous alumina, with or without extra water to make up to 100%.

Example IV.—Vermifuge

Emulsify any suitable quantity, say 50% to 90% of carbon tetrachloride, using aqueous activated gelatinous alumina, with or without extra water to make up to 100%.

Example V.—Tonic and food

Emulsify any suitable quantity, say 5% to 90% of halibut oil, using aqeous activated gelatinous alumina, with or without extra water to make up to 100%.

Example VI.—Tonic and food

Emulsify any suitable quantity, say 5% to 90% of cod liver oil, using aqueous activated gelatinous alumina, with or without extra water to make up to 100%.

Example VII.—Remedy for coughs, colds

Mix together any suitable quantity, say ½% to 5% of menthol, say ½% to 5% of camphor, say 1% to 20% of oil of eucalyptus, say ½% to 5% of creosote, and say 20% to 80% of olive oil, and emulsify the mixture using aqueous activated gelatinous alumina, with or without extra water to make up to 100%.

To produce other desired emulsions any of the above may be combined with each other as required, and to any of the above emulsions other ingredients may be added as desired.

The following are examples given purely by way of illustration of external remedies:

Example VIII.—External remedy for sprains, rheumatism, coughs

Mix together any suitable quantity, say 5% to 90% of oil of turpentine (B. P. standard), say 2% to 20% of oil of wintergreen, and say 5% to 90% of olive oil, and emulsify the mixture using aqueous activated gelatinous alumina, with or without extra water to make up to 100%.

Example IX.—External remedy for coughs, rheumatism

Mix together any suitable quantity, say 1% to 10% of menthol, say 1% to 20% of camphor, and say 5% to 90% of olive oil (B. P. standard), and emulsify the mixture using aqueous activated gelatinous alumina, with or without extra water to make up to 100%.

Example X.—External remedy for sprains

Mix together any suitable quantity, say 5% to 50% of oil of turpentine, say 2% to 20% of oil of wintergreen, say 5% to 50% of olive oil (B. P. standard), say 5% to 50% of paraffin oil (B. P. standard), say 1% to 10% of menthol and say 1% to 10% of camphor, and emulsify the mixture using aqueous activated gelatinous alumina, with or without extra water to make up to 100%.

Example XI.—Medicated beverage

Take 10 ozs. of fluid extract of sarsparilla and add 10% olive oil emulsified with aqueous activated gelatinous alumina and add water as desired.

CLASS D.—FOODS AND MEDIA FOR GREASING COOKING UTENSILS

This Class D includes substances intended for food, including flavourings and media for greasing cooking utensils, but excluding animal foods which are included in Class B. As instances of different kinds of substances intended for food may be mentioned beverages (other than medicated beverages in Class C), dressings (such as, for example, mayonnaise dressings) for foods, condiments, flavourings, sauces, gravies, meat and vegetable extracts, sweetmeats, toffee, chocolate, shortenings for pastry, cakes, and biscuits.

In the production of a large number of foods in which there are used edible oils or fats, whether animal, vegetable, mineral, or synthetic, or mixtures of the same, it is very desirable to emulsify said oils or fats in order to render the food palatable and digestible and to improve its appearance, or to enable the ingredients of the food to be satisfactorily mixed.

In the production of these foods the conditions which the emulsifying agent employed should satisfy are very exacting. Thus the emulsifying agent should, firstly, be capable of forming a permanently stable true emulsion of the material to be emulsified; secondly, it should be such that when other ingredients are added to the emulsion the latter does not crack but still remains stable; thirdly, it must not have any detrimental action on the human system and must comply with the Food and Drugs (Adulteration) Act.

Now aqueous activated gelatinous alumina as an emulsifying agent satisfies all the conditions enumerated above and is able to produce emulsions with the dispersed phase in an exceedingly fine state of division whereby the digestibility of the foods is materially increased and other beneficial physiological results obtained.

Emulsification by using aqueous activated gelatinous alumina as emulsifying agent enables emulsion-containing foods to be made with unexampled convenience in many cases. For instance, olive oil water emulsion made with this emulsifying agent may be added to an emulsion of another oil, or to an emulsion of a fat, and the two emulsions be mixed together without any specially careful manipulation or any special precautions being necessary. Moreover the other ingredients to be added can be incorporated without any detrimental effect on the emulsions.

Examples will now be given, purely by way of illustration, of the manufacture of foods according to the present invention.

Example I.—Pastry manufacture

Mix 8 ozs. of flour and half a teaspoonful of salt with 4 ozs. of butter or margarine previously emulsified with a suitable amount of water by means of aqueous activated gelatinous alumina.

Example II.—Mayonnaise dressing manufacture

To the well-beaten yolks of 2 eggs add salt and other condiments to taste. Add 2 ozs. sweetened condensed milk and then add slowly to this mass 10 ozs. more or less of olive oil which has previously been emulsified with water by means of aqueous activated gelatinous alumina. After thorough incorporation by stirring, add vinegar very slowly, constantly stirring to taste.

*Example III.—Toffee manufacture*

Emulsify 4 ozs. margarine with water using aqueous activated gelatinous alumina, and add 4 ozs. of golden syrup and 12 ozs. of brown sugar. Before the sugar is added it is melted and the other ingredients added, and the temperature is then raised until the cracked condition is reached. After the sugar has been incorporated the mass must be only lightly stirred and then be poured out on a greased tin.

*Example IV.—Artificial cream manufacture*

Take 10 ozs. of butter and add 30 ozs. of water more or less according to the quality, quantity and thickness required, together with a sufficient amount of aqueous activated gelatinous alumina to emulsify the butter. Put in a suitable mixing machine until the butter is broken down into a homogeneous cream-like mass, the flavour of which can be improved by the addition of small quantities of cane-sugar and known flavouring matters.

*Example V.—Lemon beverage*

Take 10 ozs. of lemon syrup, add 10% of olive oil emulsified with aqueous activated gelatinous alumina, and add water, as desired.

In preparations in this Class D according to the present invention emulsions of artificial flavourings, for instance, amyl acetate, methyl salicylate and ethyl acetate may be present.

CLASS E.—WATER-PAINTS, DISTEMPERS, CALCIMINES, ENAMELS, VARNISHES

This Class E includes water-paints, distempers, calcimines, enamels and varnishes.

Water-paints, either oil-bound or otherwise, have hitherto in the main been made from gelatine, casein, or mixtures of the same, with or without an amount of oil emulsified into them, pigment being added. All such paints dry with a flat, matt, or dull surface, none of them drying with a glossy surface.

In the process according to the present invention linseed oil, cotton-seed oil, rape-seed oil, or other drying or semi-drying oil, synthetic resin, or ester gum, or bitumen, or asphalt, is emulsified with water, the emulsifying agent employed being aqueous activated gelatinous alumina. The emulsion is thinned, if desired, by the introduction of the desired quantity of water or oil, no volatile inflammable thinners, such as turpentine for example being required. Preferably no volatile or inflammable thinners are added as supplementary thinners, but such thinners might be added in addition to the thinning water. Driers are preferably added to the materials to be emulsified before the emulsification process, and, preferably after emulsification, the desired quantity of pigment is ground in. The viscosity, flow or other qualities may be controlled by the addition of ethers, esters, alcohols, thick or thin oil, (that is, oil of higher or lower viscosity), or water, should it be so desired.

The water-paint or the like produced by this process when applied to, or painted on, a surface, dries out to a homogeneous glossy structure-less film. The bituminous and asphaltic water-paints according to the present invention are cheap, durable, and elastic, and possess marked adhesive qualities.

A water-paint, enamel, varnish, or the like, according to the present invention comprises an emulsion in water of linseed oil, cotton-seed oil, rape-seed oil, or other drying or semi-drying oil, synthetic resin, or ester gum, or bitumen, or asphalt the emulsifying agent present being aqueous activated gelatinous alumina. Instead of water-in-oil emulsions oil-in-water emulsions may be used. Driers and pigments are also present. In these products oil is used preferably only as the binder and preferably the only thinner employed is water. Such preferred products which are high gloss paints or enamels, are non-inflammable in the liquid state and also in the dry state, through water having been substituted for the usual inflammable thinners.

The following are examples of paints or preparations according to the present invention, the first being an example of a high gloss paint or enamel.

*Example I*

| | |
|---|---|
| Emulsion (about 20% water) of thick linseed oil in water with aqueous activated gelatinous alumina as emulsifier_____ounces__ | 40 |
| Emulsion (about 20% water) of thin linseed oil in water with aqueous activated gelatinous alumina as emulsifier_____ounces__ | 40 |
| Zinc oxide_____pounds__ | 3 |
| Lead resinate_____ounce__ | ¼ |
| Cobalt resinate_____ounce__ Say | 0.01 |

*Example II*

| | Parts |
|---|---|
| Emulsion in water of the synthetic resin known under the registered trade-mark "Glyptal", with aqueous activitated gelatinous alumina as emulsifier, the water content of the latter being unimportant_____ | 40 |
| Emulsion of linseed oil in water with aqueous activated gelatinous alumina as emulsifier, the water content of the latter being unimportant_____ | 40 |

*Example III*

| | Parts |
|---|---|
| Emulsion of ester gum in water, with aqueous activated gelatinous alumina as emulsifier, the water content of the latter being unimportant_____ | 20 |
| Emulsion of China-wood oil in water, with aqueous activated gelatinous alumina as emulsifier, the water content of the latter being unimportant_____ | 20 |
| Emulsion of linseed oil in water, with aqueous activated gelatinous alumina as emulsifier, the water content of the latter being unimportant_____ | 40 |

The ester gum is melted and the emulsions are formed separately and mixed together or the ingredients may first be mixed and then be emulsified in one operation.

CLASS F.—PROOFING PREPARATIONS, ROOF PREPARATIONS, PREPARATIONS FOR TREATING SURFACES, FOR INSTANCE ROAD SURFACES AND PREPARATIONS FOR IMPREGNATING MATERIALS

This Class F, from which are excluded the water-paints, distempers, calcimines, enamels and varnishes, included in Class E, includes other preparations for rendering materials or buildings or other structures more or less waterproof, preparations for preserving materials, roofing preparations, preparations for treating surfaces, for instance, road, railroad, footpath and race-track surfaces, and preparations for impregnating materials for preserving, sound proofing or other purposes, all hereinafter included in the term "proofing materials".

Preparations in this Class F, according to the present invention consist of, or comprise, emulsions with water of one or more oils, tars, pitches, creosotes, asphalts, bitumens, fats, or waxes, the emulsifying agent contained therein being aqueous activated gelatinous alumina.

Whereas in the past such emulsified materials have been used for the same purposes as those for which the new preparations are intended, the emulsions hitherto used have been found to be lacking in stability, or the state of emulsification has not been satisfactory. Moreover the oils which have been used for the emulsions have been few in number, and in the case of the emulsifying agents, most of which in themselves are detrimental, which have been used, it has been a matter of supreme importance to use water of special quality. The latter disadvantage has proved to be particularly serious.

The preferred process for manufacturing the new preparations consists of, or comprises, emulsifying with water one or more oils, tars, pitches, creosotes, asphalts, bitumens, fats, or waxes, using aqueous activated gelatinous alumina as the emulsifying agent. When a preparation is to contain one or more different ingredients the same may be emulsified separately and the resulting emulsions then be mixed together, or the ingredients may first be mixed together and then be emulsified simultaneously.

By using aqueous activated gelatinous alumina as the emulsifier, any oil may be emulsified whatever, practically speaking, its type, quality or condition. Moreover when forming emulsions by means of aqueous activated gelatinous alumina the water employed as constituent of the emulsifying agent or any extra water added prior to the emulsification process or subsequently mixed with the emulsion may in the vast majority of cases be of practically any kind, for instance, soft, hard, brackish, or saline, or lime-water may be used. Further, by using aqueous activated gelatinous alumina the state of division of the emulsified material may be exceedingly fine, without special precautionary means having to be adopted, so that very superior emulsions can be manufactured with the greatest ease.

A very great variety of preparations in this Class F may be produced. For instance, more or less elastic water-proof materials for use in building construction may be prepared from tar, pitch, creosote, asphalt, and bitumen. Such materials may be more or less sound-proof. Other preparations, for instance, oil emulsions, fat emulsions, wax emulsions, may be used for waterproofing fabrics, paper, cardboard, pasteboard, or the like. Other preparations, for instance, emulsions of creosote, tar, bitumen, asphalt, may be used as preservatives, for preserving timber. Some preparations, for instance, oil emulsions, tar emulsions, pitch emulsions, creosote emulsions, asphalt emulsions, may be used as binders for materials forming roads. Some preparations, for instance, oil emulsions, tar emulsions, pitch emulsions, asphalt emulsions, bitumen emulsions may be used for spraying road and other surfaces, for instance, for the purposes of laying dust on such surfaces.

The articles and structures—treated with the new preparations—according to the present invention include, for instance, textile fabrics, paper, timber, buildings, roads. Slag or seaweed may be incorporated in the preparations.

The following emulsions are given merely by way of example.

*Example I.—Paraffin wax emulsion (33⅓%)*

Melt 10 parts of solid paraffin wax on the surface of 20 parts water heated to boiling, the water containing 4 parts of aqueous activated gelantinous alumina (95% water content). Shake water and the molten wax vigorously, while still hot, to form a relatively coarse emulsion. Run this in turn, through a steam jacketed homogeniser. On subsequent cooling the resultant fine emulsion will remain stable, and can readily be diluted with water, even down to a wax content of less than one per cent.

*Example II.—Creosote emulsion*

Shake 5 parts by volume of crude creosote with 10 parts of a 1% (solid content) aqueous activated gelatinous alumina, in the cold, and immediately homogenise. The resultant light brown emulsion, quite distinct from the black relatively coarse initial emulsion obtained on shaking, is stable and can be diluted readily with water. No separation of creosote, which would be readily visible as black droplets, is apparent after 2 weeks.

*Example III.—Bitumen emulsion*

| | Parts |
|---|---|
| Bitumen | 50 |
| Water | 25 |
| Aqueous activated gelatinous alumina (5% $Al_2O_3$) | 25 |

Mix thoroughly the water and activated gelatinous alumina and heat to boiling. Heat the bitumen separately to 100° C. and add gradually to the aqueous mix with vigorous mechanical stirring. The dispersion may conveniently be carried out in a steam jacketed colloidal mill.

*Example IV.—Tar emulsion*

| | Parts |
|---|---|
| Tar | 10–80 |
| Tar oil | 2–30 |
| Water | 20–60 |
| Aqueous activated gelatinous alumina (5–10% $Al_2O_3$) | 20–30 |

Mix the activated gelatinous alumina with the water and heat to boiling. Now heat to 100° C. the tar separately; add the tar oil and pour slowly into the violently agitated aqueous mix. The dispersion may conveniently be made in a steam jacketed colloidal mill.

CLASS G.—LUBRICANTS

This Class G includes lubricants consisting of, or comprising, an emulsion of a lubricating oil and/or fat containing aqueous activated gelatinous alumina as the emulsifying agent. The oil and/or fat may be mineral, vegetable, animal or synthetic.

Recent researches on the question of lubricating oils have shown that in their more or less natural condition and even after purification said oils are still not in the best possible condition for the purpose for which they are produced.

It has been found that a greater degree of purity and a better physical condition of such oils can be brought about by emulsification, but the attempts which have hitherto been made have only met with qualified success owing to the inherent defects of the emulsifier.

Now it has been discovered that the most excellent lubricants can be manufactured from oils or fats emulsified by means of aqueous activated gelatinous alumina as the emulsifying agent.

As an example, purely by way of illustration, of a lubricant according to the present invention, may be mentioned an emulsion with water of any suitable petroleum oil, the emulsifying agent being aqueous activated gelatinous alumina. As an instance of the percentage composition there might be about 90% petroleum oil, about 10% aqueous activated gelatinous alumina.

In carrying out the process according to the present invention the aqueous activated gelatinous alumina may be added to the oil or fat and agitated therewith before the addition of extra water, if any; or it may be added to extra water, if any, before being mixed with the oil or fat, and agitation may occur at any stage; or it may be added to a mixture of oil and/or fat with extra water, and be agitated therewith.

A lubricant according to the present invention may consist of or comprise a number of emulsions of different oils and/or fats mixed together and in the manufacture of such emulsions the same may be produced separately and then be mixed together, or they may be produced simultaneously by emulsifying a mixture of said oils and/or fats by means of aqueous activated gelatinous alumina.

If desired, a lubricant according to the present invention may comprise an emulsion containing the aqueous activated gelatinous alumina and also an emulsion containing some other emulsifier.

CLASS H.—POLISHES AND CLEANING PREPARATIONS

This Class H includes polishing and cleaning preparations, both solid and liquid, and more particularly, but not exclusively, polishes and cleaners for wood, leather, both natural and artificial, linoleums, floor surfaces, furniture, upholstery, metals, motor car bodies and hoods, glass, porcelain, and painted or varnished surfaces in general.

A preparation, in this Class H, according to the present invention comprises or consists of an emulsion of an oil, fat, wax, or resin, the emulsifying agent employed being aqueous activated gelatinous alumina. Such emulsions, on account of the large quantity of water which can be incorporated in them without detrimentally affecting their stability, have very pronounced cleaning powers. The preparations may comprise or consist of a mixture of such emulsions.

Preparations, in this Class H, according to the present invention may if desired contain, in addition to the emulsion, or mixture of emulsions, diatomaceous or one or more other suitable earths, chalks, ethers, esters, alcohols, chlorinated compounds, acids or alkalis, or silica, or hexahydronaphthalene.

These preparations can be manufactured extremely simply and a very great variety of exceedingly cheap products may be obtained.

The following compositions are given simply by way of example of polishes and cleaning preparations in this class:

*Example I*

| | |
|---|---|
| Butyl alcohol | 10% |
| Kerosene | 15% |
| Paraffin oil | 3% |
| Rotten stone | As desired. |

Aqueous activated gelatinous alumina with water to make up to 100%, the water content of the aqueous activated gelatinous alumina being unimportant.

*Example II*

| | Per cent |
|---|---|
| Turpentine | 10 |
| Camphor oil | 5 |
| Linseed oil | 35 |
| Paraffin oil | 2½ |

Aqueous activated gelatinous alumina with water to make up to 100%, the water content of the aqueous activated gelatinous alumina being unimportant.

*Example III*

| | Per cent |
|---|---|
| Hard paraffin wax | 10 |
| Montan wax | 10 |
| Oil of turpentine | 40 |

Aqueous activated gelatinous alumina with water to make up to 100%, the water content of the aqueous activated gelatinous alumina being unimportant.

*Example IV*

A polish, particularly suitable for metals, glass, Celluloid articles, porcelain, stone, marble natural and artificial, cellulose finishes of furniture and motor cars, consists of the following:

| | Grammes |
|---|---|
| Raw linseed oil | 25 |
| Cocoanut oil | 21 |
| Hexahydronaphthalene | 65 |
| Carbon tetrachloride | 61 |

Emulsify the mixture with aqueous activated gelatinous alumina in sufficient water to give the required viscosity, the water content of the aqueous activated gelatinous alumina being unimportant.

CLASS I.—FUEL OR FUEL COMPOSITIONS

This Class I includes fuel, or fuel compositions which consist of, or comprise, firstly, solid fuel preferably pulverised fuel, for instance, coal dust, sawdust, powdered peat, or charcoal or carbon in other forms, and secondly, an emulsion which itself consists of an emulsion of vegetable, mineral, or animal oil, wax, fat, either natural or synthetic, containing aqueous activated gelatinous alumina as the emulsifying agent, and thirdly, if desired, water additional to that contained in said emulsifying agent. The amount of water contained in the fuel depends on the amount of water in said emulsifying agent, and on the quantity of said emulsifying agent employed in making the emulsion, and on the additional quantity of water introduced, if any.

The quantity of water contained in any particular fuel depends on the rate of combustion which it is desired that the particular fuel shall have under given conditions. Through the presence of the emulsified material which contains water and the presence of more or less additional water in the new fuel, spontaneous combustion, to which pulverised fuels are particularly liable, is completely prevented, since the fuel remains comparatively non-inflammable in storage but is readily ignited as and when required.

As the added water is part and parcel of the material which is emulsified into it, the emulsion remains in a stable condition indefinitely and is in a condition in which the solid materials are combined with great ease and uniformity, the binding properties of these emulsions being more than sufficient to hold the solid particles in a stable and uniform mass, which can be easily handled and stored with complete immunity from such dangers as fire and explosion etc.

The fuel according to the present invention may be simply a disintegrated mixture of the solid fuel and the emulsion with or without extra water, or it may be in the form of hard compressed briquettes, or it may be in a more or less liquid or fluid form.

When in a liquid or fluid form it may be added to blocks of solid fuel, for instance, blocks of peat, by impregnating the latter with it. On account of the large percentage of water contained in peat the liquid fuel containing a minimum quantity of water will preferably be employed.

If desired the fuel may comprise, in addition to the ingredients mentioned above, any other ingredients, for instance, non-emulsified oils, tarry matters, kerosenes, or other inflammable or non-inflammable materials.

In some cases and for certain purposes, such as for use in internal combustion engines, the solid fuel which forms one ingredient of the fuel according to the present invention may be in such a fine state of division as to approximate to a colloidal size before mixing with the emulsion.

The preferred process for manufacturing the new fuels comprises emulsifying vegetable, mineral, or animal oil, fat, wax, either natural or synthetic, using aqueous activated gelatinous alumina as the emulsifying agent. To the emulsion thus produced, water additional to that contained in the emulsifying agent is added if desired, and there is then incorporated in the emulsion any suitable solid fuel, preferably pulverized fuel for instance, coal dust, sawdust, powdered peat, or charcoal or carbon in any other form. For instance, fuel in a very fine state of division may be employed. All the ingredients are thoroughly mixed together, and if desired, the fuel is compressed into briquettes.

If desired, there may be incorporated in the fuel in addition to the ingredients mentioned above any other ingredients, for instance, non-emulsified oils, tarry matters, kerosenes and other inflammable materials.

The ingredients may be mixed together in any suitable order and in some cases the solid fuel may be added to the material to be emulsified before the latter is emulsified. If desired all the materials except the emulsifying agent may be mixed together before the addition of the emulsifying agent.

If desired, the solid fuel forming one ingredient of the new fuel may be incorporated into the emulsion by impregnating it with the emulsion.

As examples of mineral oils may be mentioned petrol and crude oils suitable for Diesel engines.

The following fuel is given simply by way of example:

*Example.—Fuel emulsion*

| | Parts |
|---|---|
| Crude oil | 18 |
| Aqueous activated gelatinous alumina (5% $Al_2O_3$) | 1 |
| Water | 1 |
| Powdered coal preferably crushed | 20 |

Mix the activated gelatinous alumina with the water and add the oil in small quantities with vigorous agitation. The result is an almost solid emulsion with the oil as internal phase. Now gradually stir the coal into this emulsion. Phase reversal occurs with the formation of a mobile emulsion from which there is no separation of water and which retains the coal in suspension more efficiently than does the oil.

CLASS J.—PREPARATIONS CONTAINING RUBBER

This Class J includes preparations consisting of or containing emulsions of rubber.

The preferred process of manufacturing these preparations consists in or comprises dissolving unvulcanised or raw rubber in any suitable solvent, for instance, naphtha or hexahydronaphthalene, and mixing aqueous activated gelatinous alumina with the same, preferably in a suitable machine. Extra water may be added if desired to the emulsifying agent. Other ingredients may be added and mixed with those mentioned above, ingredients which are capable of being emulsified by said emulsifying agent being employed if desired. For instance, one or more oils, fats, waxes, whether natural or synthetic, tars, asphalts, or bitumens may be added or mixtures of any of these.

A preparation, in the Class J, according to the present invention comprises an emulsion of unvulcanised rubber or raw rubber in water and in a solvent of unvulcanised or raw rubber, the emulsifying agent employed being aqueous activated gelatinous alumina. Other ingredients may be added, for instance, the preparation may also contain emulsions of one or more oils, fats, waxes, tars, asphalts, or bitumens, the emulsifying agent employed being aqueous activated gelatinous alumina.

The following are examples of preparations in this class:

*Example 1*

Take crepe rubber 10 grammes and solvent naphtha about 90 grammes to form solution A. Take water 50 grammes and sufficient aqueous activated gelatinous alumina to emulsify the rubber in solution A to form dispersion B. B is then added to A more or less slowly and is mixed therewith.

*Example 2*

Take solution A of Example 1 and 5 grammes of linseed oil and then add dispersion B with sufficient extra aqueous activated gelatinous alumina to emulsify said linseed oil.

The preparations according to the present invention may be used for most or all of the purposes for which rubber solutions have hitherto ordinarily been employed.

CLASS K.—CEMENTITIOUS COMPOSITIONS

The Class K includes cementitious compositions.

The cement and the like, in this class, according to the present invention may be used in building construction, road-making, bridge-building, reinforcing, the construction of culverts, dams, tanks, reservoirs, pipes for all purposes, tiles, posts for fencing, and indeed may in general be employed for all purposes for which cement may be used. When it possesses a high water content, it may be used for rust prevention of steel and iron work, pipes, ships' hulls, and for wall dressings.

These cementitious compositions consist of or comprise a mixture of Portland cement, or lime or the like, with one or more emulsified oils, fats, waxes, either mineral, vegetable or animal, or synthetic, bitumens, asphaltums, tars, creosotes, or synthetic or natural resins, the emulsifying agent present being aqueous activated gelatinous alumina. To the mixture may be added any particular solid such as ground rubble or other aggregate, sand, asbestos, wood flour, the particular solid being chosen for the particular purpose in view.

The process employed in the manufacture of these compositions, consists in emulsifying the ingredients or ingredients to be emulsified and in mixing all the ingredients together. The consistency is controlled by the addition of more or less water which can be added to the emulsifiable materials at the time of emulsification or may be added to the final product. The emulsification may be effected after some or all of the ingredients have been mixed together. When required enough water may be added to enable the mass to be sprayed or brushed on to the wall to form a protective or decorative dressing, suitable colouring media being added for the latter purpose.

Cementitious compositions according to the present invention possess the advantage of being less porous than ordinary cement.

The following examples are given, purely by way of illustration, of cementitious preparations according to the present invention.

Example I

| | Parts |
|---|---|
| Portland cement | 10 |
| Linseed oil | 10 |
| Fine sand | 30 |
| Water and aqueous activated gelatinous alumina | 5 |

Add sufficient water to produce a consistency to trowel, spray or brush.

Example II

| | Parts |
|---|---|
| Portland cement | 10 |
| Linseed oil | 10 |
| Water and aqueous activated gelatinous alumina | 5 |
| Aggregate | 30 to 60 |

Example III

| | Parts |
|---|---|
| Portland cement | 10 |
| Linseed oil | 5 |
| Water and aqueous activated gelatinous alumina | 5 |
| Fine sand | 30 |

Add sufficient water to produce a consistency to trowel, spray or brush.

CLASS L.—PLASTICIZERS FOR CELLULOSE MATERIALS, AND PLASTIC MASSES OF PLASTICIZED CELLULOSE MATERIALS

It is well known in the production of products comprising cellulose acetate, cellulose nitrate and other cellulose compounds for manufacturing a great variety of materials, for instance, fabrics, plastics, films, paints, enamels and lacquers, that the introduction of a plasticizing agent adds toughness and suppleness, and wearing qualities, which qualities are frequently required.

Plasticizers, in this class, according to the present invention consist of, or comprise, an emulsion in water of one or more mineral, vegetable, or animal oils or fats, natural or synthetic, with aqueous activated gelatinous alumina as the emulsifying agent.

These plasticizers may also comprise one or more additional ingredients, for instance, comparatively small quantities of ethers, esters, ketones, alcohols, or other compounds preferably having an evaporative rate higher than that of water and which are solvents of cellulose materials. Such ingredients as those specifically referred to above are preferably added in cases in which the introduction of the water brings about a degradation of the cellulose compound or material, since said ingredients prevent or cure said degradation.

The following examples of emulsions according to the present invention are given purely by way of illustration.

Examples.—Lacquer emulsions

| | Per cent |
|---|---|
| Water | 50 |
| Nitrocellulose in amyl acetate | 40 |
| Aqueous activated gelatinous alumina (95% water) | 10 |

The lacquer and activated gelatinous alumina are stirred into a paste and water then added slowly with vigorous stirring. The resulting "lacquer in water" emulsion can be homogenised. An emulsion of a plasticizer may then be added in the desired amount. A typical emulsion of said plasticizer is:—

| | Per cent |
|---|---|
| Castor oil | 50 |
| Water and activated gelatinous alumina | 50 |

Addition of emulsified plasticizer to lacquers

The addition of emulsified plasticizer can be made direct to the lacquer, the emulsion being added slowly with stirring, to the desired amount.

Example

| | Per cent |
|---|---|
| Lacquer as in above example | 90 |
| Linseed oil | 5 |
| Water and activated gelatinous alumina (5% Al$_2$O$_3$) | 5 |

A few industrial applications of emulsions and preparations according to the present invention will now be set forth by way of example.

CLASS M.—APPLICATION IN SOAP MANUFACTURE

In the ordinary manufacture of hard soap very considerable time is occupied in boiling the oils and/or fats together with the caustic alkali to bring about the desired saponification of the said oils and/or fats. In the case of the ordinary manufacture of soft soap, the time occupied is still considerable though much less. In order to accelerate manufacture it has already been proposed to emulsify the oils and/or fats before saponification. In the application of the present invention to this mode of manufacture in which oils and/or fats are emulsified with water before saponification an emulsion of the oils and/or fats with aqueous activated gelatinous alumina as the emulsifying agent is produced. The particle size is preferably in the neighbourhood of 1 to 2 microns approximately. If starting materials other than oils or fats are present, such as resin or oleic acid for example, such other starting materials are also preferably emulsified by means of aqueous activated gelatinous alumina. The starting materials may be separately emulsified and their emulsions be subsequently mixed, or mixtures of the starting materials may be emulsified.

It has been found that if the said oils and/or fats are in the first place emulsified in the above manner into a fine state of emulsification, the action between the alkali and the extremely fine particles of the emulsions is particularly rapid, so that the time of saponification is very considerably diminished and the cost of manufacture reduced. Moreover the products produced are of a very superior quality.

After the completion of the saponification process the usual salt and other treatments may be carried out in the ordinary manner as in the normal process of soap manufacture.

Two applications of the present invention to soap manufacture will now be described, purely by way of example.

*Example I.—Cocoanut oil soap*

| | |
|---|---|
| Potassium hydroxide_____grams__ | 40 |
| Sodium hydroxide_____do____ | 40 |
| Distilled water_____cc__ | 50 |
| Cocoanut oil_____grams__ | 400 |
| Aqueous activated gelatinous alumina and water _____cc__ | 50 |

Dissolve the 40 grms. of potassium hydroxide and 40 grms. of sodium hydroxide in 50 cc. of water. In another container emulsify 400 grms. of cocoanut oil and 50 cc. of distilled water using aqueous activated gelatinous alumina as the emulsifying agent and warm the emulsion to the temperature of the potassium hydroxide and sodium hydroxide solution. Then add the lye to the emulsified cocoanut oil and stir for about 3 minutes and set aside in a warm place for 24 hours or more.

*Example II.—Castile soap*

| | Pounds |
|---|---|
| Sodium hydroxide_____ | 3 |
| Olive oil_____ | 17 |
| Distilled water_____ | 100 |
| Sodium chloride_____ | 5 |
| Aqueous activated gelatinous alumina and water sufficient to emulsify the olive oil. | |

Dissolve 3 lbs. of sodium hydroxide in 9 lbs. of distilled water and allow to become perfectly cold. In another container place 17 lbs. of olive oil and emulsify it with 7 lbs. of distilled water and aqueous activated gelatinous alumina. Then to this emulsion add slowly the 12 lbs. of lye, stirring gently without stopping until the emulsion and lye are thoroughly combined. The oil being first broken up into minute globules with the emulsifying agent to form an emulsion will greatly aid in hastening the saponification and will also assure the complete saponification. The mass is then placed in a warm place to complete saponification. After complete saponification it is placed in another container of suitable size and a further 64 lbs. of distilled water is added and heated until the magma is dissolved or becomes transparent, it being of a tenacious nature when the heat is removed. In the meanwhile 5 lbs. of sodium chloride are dissolved in 20 lbs. of distilled water at 100° C., and immediately transferred into the hot soap solution. Stir until the glycerine is liberated. Further moderate heat may be required before the soap forms. Set aside to allow the soap to rise to the surface, after which drain off the liquid. The solid soap is washed and cut into blocks and set aside to dry.

CLASS N.—APPLICATION IN TREATMENT OF WASTE OIL AND WASTE OIL-CONTAINING WATER

Emulsions and preparations according to the present invention may be applied in processes for the treatment of waste oil and waste-oil containing water, for instance, bilge water, for the purpose of rendering the same less obnoxious, and more particularly but not exclusively to processes for preventing or minimising the formation of films of oil on the ocean when bilge water is discharged into the sea, or when oil carriers or oil-burning vessels have their containing chambers periodically cleaned, whether the waste oil be discharged into the sea or not.

In the application of the present invention in these processes for treating waste oil and water containing waste oil an emulsion according to the present invention is formed by emulsifying the waste oils in water by means of aqueous activated gelatinous alumina as the emulsifying agent which is added to and agitated with the waste oils, or the bilge water, or other waste water containing oil. By emulsifying said oils into an extremely fine state of division, the oils are so broken up that when discharged into the sea they are dispersed and cannot form an oil film. The process may of course be employed for cleaning oil carriers, oil sumps, oil tanks, or oil-containing chambers, for instance those of oil-burning vessels, whether the waste-oil be discharged into the sea or not. The emulsions produced may, of course be used for a variety of useful purposes. The process may thus convert waste oil into a useful product.

Any suitable apparatus may be employed in carrying out the new process.

The following is one method, given purely by way of example, of the application of the present invention to the treatment of bilge water.

The bilge water with waste oil is agitated by mechanical means and aqueous activated gelatinous alumina, with or without extra water, is added and the mixture is agitated to form an emulsion of the oil with water. This emulsion can be passed into the sea, or into containers, or carriers, at once. However, in order to break up the oil globules into a finer state, it may be passed through a homogeniser, and then be passed into the sea, containers, or carriers. When this emulsion made with aqueous activated gelatinous alumina comes into contact with the sea water, the oil globules do not flow together forming a blanket-like mass of oil on the surface of the sea, but the globules are dispersed in all directions. If soap or soap-like emulsifying agents were employed, the salt sea water would throw out the oil from the emulsion immediately on the latter being discharged into the sea, and oil films would form on the surface of the sea.

CLASS O.—APPLICATION IN THE MANUFACTURE OF PLASTICIZED CELLULOSE MATERIALS OR ARTICLES, OTHER THAN PLASTIC MASSES

In the application of the present invention to the manufacture of plasticized cellulose materials or articles in this class there is added to the cellulose material one of the plasticizers hereinbefore referred to in Class L. This may be effected by adding the plasticizer, or its ingredients, to the cellulose material or compound at any suitable stage. The addition of the plasticizer may be the last operation and may be effected by passing the cellulose material through, or soaking the same in, a bath containing the emulsion.

What I claim is:

1. A stable emulsion comprising water, a liquid immiscible with water and activated gelatinous alumina which is prepared by boiling in water a precipitate of gelatinous alumina and ageing the same.

2. A pharmaceutical preparation comprising a stable emulsion as claimed in claim 1.

3. A pharmaceutical preparation comprising a stable emulsion as claimed in claim 1, the liquid immiscible with water being cod liver oil.

4. A cosmetic preparation comprising a stable emulsion as claimed in claim 1.

5. A cosmetic preparation comprising a stable emulsion as claimed in claim 1, the emulsion being an emulsion of fat with water.

6. A cosmetic preparation comprising a stable emulsion as claimed in claim 1, the stable emulsion being an emulsion of benzoinated lard and expressed almond oil with water.

7. An insecticide comprising a stable emulsion as claimed in claim 1.

8. An insecticide comprising a stable emulsion as claimed in claim 1, the emulsion being an emulsion with water of an oil and an oleate.

9. An insecticide comprising a stable emulsion as claimed in claim 1, the emulsion being an emulsion with water of paraffin oil and copper oleate.

THURSTAN WYATT DICKESON.